United States Patent [19]

Tanaka

[11] Patent Number: 4,593,237
[45] Date of Patent: Jun. 3, 1986

[54] SERVO-SYSTEM HAVING AN ADJUSTMENT INDICATOR

[75] Inventor: Hidetake Tanaka, Tokyo, Japan

[73] Assignee: Ricoh Company Ltd., Japan

[21] Appl. No.: 549,249

[22] Filed: Nov. 4, 1983

[30] Foreign Application Priority Data

Nov. 6, 1982 [JP] Japan .................................. 57-195181

[51] Int. Cl.⁴ ............................................. G05B 13/00
[52] U.S. Cl. ..................................... 318/561; 318/632; 318/594
[58] Field of Search ............... 318/632, 633, 594, 595, 318/561, 601; 364/148, 151, 159, 167, 170, 149, 150, 575

[56] References Cited

U.S. PATENT DOCUMENTS

| | | | |
|---|---|---|---|
| 2,835,856 | 5/1958 | Moseley | 318/632 |
| 3,551,656 | 12/1970 | Wohlfeil | 318/594 X |
| 4,140,953 | 2/1979 | Dunne | 318/632 X |
| 4,268,783 | 5/1981 | Murray | 318/561 X |
| 4,302,666 | 11/1981 | Hawkins | 318/594 X |

Primary Examiner—William M. Shoop, Jr.
Assistant Examiner—Patrick C. Keane
Attorney, Agent, or Firm—Guy W. Shoup

[57] ABSTRACT

An adjustable servo-system for controlling the operating condition of its servo-motor adjustably includes an indicator unit capable of indicating a new optimum operating time to be used. The operator can set the new optimum operating time in the servo-system just by looking at the indicator.

11 Claims, 4 Drawing Figures

SERVO-SYSTEM HAVING AN ADJUSTMENT INDICATOR

BACKGROUND OF THE INVENTION

1. Field of the Invention

This invention generally relates to a servo-system or servomechanism, and particularly to a digitally controlled electrical servo-system for controlling the operating time period of a servo-motor. More specifically, the present invention is concerned with an incremental servo-control system including a servo-motor which may, for example, be used as a selection motor for driving to rotate a print wheel to have a selected type located at a predetermined printing position, a motor for driving to move a carriage carrying thereon a printing head along a platen roller in a reciprocating manner, or a motor for driving to move an optical system in a copier for scanning an original placed on an original holder.

2. Description of the Prior Art

A servo-system is basically an automatic feedback system which allows the controlled quantity or output, defined by a variance in position, orientation, velocity and the like of a target, to follow arbitrary changes in the target value or input. The controlled quantity in the servo-system implies a mechanical variance such as position, velocity and acceleration in contrast to state variables such as temperature, density and pressure which are of concern in the process control.

In adjusting the velocity of a servo-motor, it has conventionally been proposed to use such elements as potentiometers, jumpers and switches. However, if use is made of a potentiometer, an operator is required to adjust the potentiometer appropriately while measuring the real velocity or operating time period of servo-motor which is time consuming and expensive. Moreover, if the velocity must be readjusted due, for example, to maintenance of apparatus, resetting of potentiometer is also required. In addition, potentiometers are expensive as compared with fixed resistors. Use of jumpers and switches is equally unpromising because a great number of such elements must be provided if it is desired to carry out fine adjustments, which tends to push up cost and occupy a larger mounting space. Thus, there has been a need to develop an adjustable servo-system which is easy to operate, simple and compact in size and thus less expensive to make.

SUMMARY OF THE INVENTION

The disadvantages of the prior art have been obviated and an improved servo-system is hereby provided.

Therefore, it is a primary object of the present invention to provide an improved adjustable servo-system.

Another object of the present invention is to provide an adjustable servo-system having an indicator as a guide for adjustments.

A further object of the present invention is to provide an adjustable servo-system simple in structure and easy to operate.

A still further object of the present invention is to provide an adjustable servo-system capable of adjusting the operating time period of servo-motor with ease.

Other objects, advantages and novel features of the present invention will become apparent from the following detailed description of the invention when considered in conjunction with the accompanying drawings.

DESCRIPTION OF THE PREFERRED EMBODIMENTS

Figure 1:
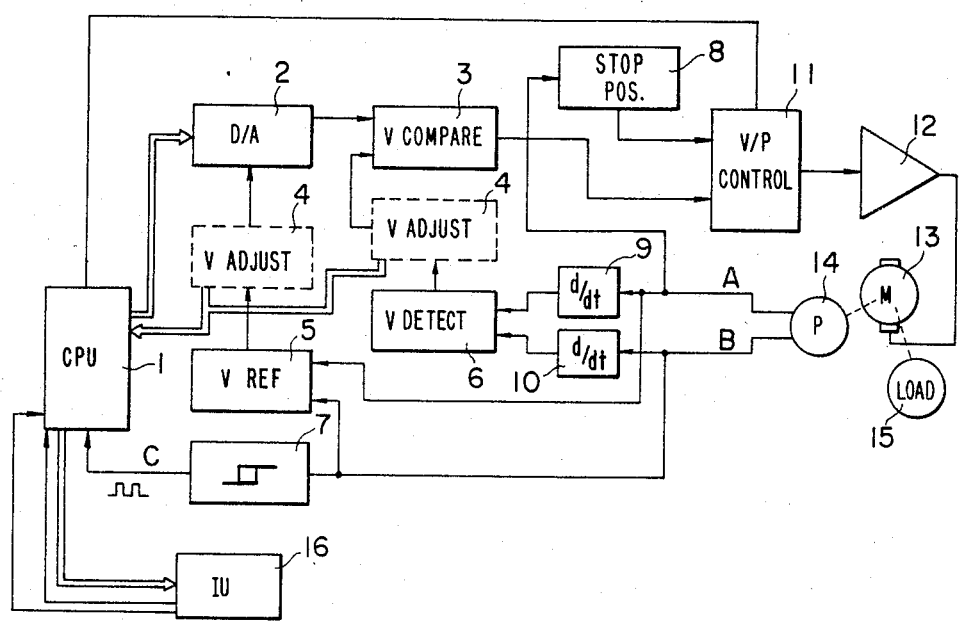
FIG. 1 is a block diagram schematically showing a servo-motor control system for which the present invention may be advantageously applied.

Referring now to FIG. 1, there is shown a servo-motor control system to which the present invention may be advantageously applied, and it includes a processing unit 1, a digital-to-analog (D/A) converter 2, a velocity deviation detecting unit 3, a velocity adjusting unit 4, a reference signal generating unit 5, a velocity signal generating unit 6, a Schmitt circuit 7, a stop position control unit 8, differentiators 9 and 10, a velocity/position control switching unit 11, a motor driving unit 12, a servo-motor 13, an encoder 14 and a load 15. The encoder 14 is directly or indirectly connected to the servo-motor 13 and it generates a pair of position signals A and B, which are out of phase by 90° from each other, as the motor 13 rotates. These position signals A and B are supplied to the respective differentiators 9 and 10, where the signals are suitably differentiated, and then to the velocity signal generating unit 6, where the signals are suitably processed such as rectified and added, thereby producing a velocity signal.

On the other hand, the position signals A and B are also supplied to the reference signal generator 5 which then generates a reference signal as determined by the amplitudes of the position signals A and B. As indicated by the dotted lines in FIG. 1, the velocity adjusting unit 4 may be provided as interposed between the D/A converter 2 and the reference signal generator 5 or between the velocity deviation detecting unit 3 and the velocity signal generating unit 6. Thus, an output from either of the velocity signal generating unit 6 or reference signal generating unit 5 is supplied to the corresponding one of either one of the velocity deviation detecting unit 3 and D/A converter 2 after having been adjusted to a desired level by the velocity adjusting unit 4. The position signal B is also supplied to the Schmitt circuit 7 which then supplies a position clock signal C to the processing unit 1, which may be comprised of a microprocessor for controlling the overall operation of the present system, and, thus, the processing unit 1 supplies a velocity command level signal corresponding to the moving distance for the motor 13 to the D/A converter 2, which, in turn, supplies a velocity command signal corresponding to the velocity command level signal thus received.

The velocity deviation detecting unit 3 compares the velocity command signal supplied from the D/A converter 2 with the velocity signal supplied from the velocity signal generating unit 6 thereby outputting a velocity deviation signal which is supplied as an input to the velocity/position control switching unit 11, which is also connected to receive a position deviation signal from the stop position control unit 8. Thus, under the control of the processing unit 1, the velocity/position control switching unit 11 allows to pass either one of the velocity deviation signal or position deviation signal selectively to the motor driving unit 12, which then supplies a power-amplified signal to the motor 13. The processing unit 1 controls such that velocity control takes place until the motor 13 has reached a point located at a predetermined vicinity of a targeted position and the motor 13 is caused to move from the predetermined vicinity to the destination under position control rather than velocity control. In accordance with this sequence of operation, the motor 13 comes to a halt at a desired position stably as well as accurately after travelling over a necessary distance.

Figure 2:
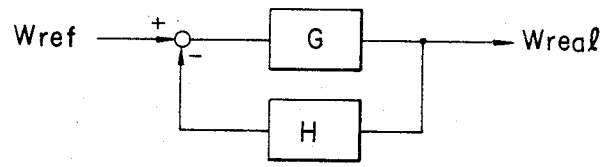
FIG. 2 is a block diagram showing the velocity control portion of the system shown in FIG. 1.

FIG. 2 is a schematic illustration showing in block form the velocity control portion of the system shown in FIG. 1, in which G indicates a circuit gain and H indicates a feedback gain in motor speed control. As is well known in the art, the relation between a desired speed $W_{ref}$ and a real velocity $W_{real}$ may be expressed by the following equation.

$$W_{real} = \frac{G}{1+GH} W_{ref} \quad (1)$$

Figure 3:
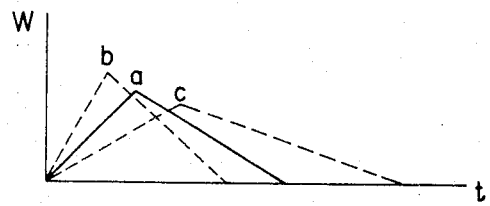
FIG. 3 is a graph showing the relation between angular velocity W and operating time t which is useful for explaining the operation of the system of FIG. 1.

In the case where $G \gg 1$, $W_{real} \cong (1/H) W_{ref}$, so that, in order to adjust the velocity of motor, it is only necessary to suitably change the magnitude of $W_{ref}$ or H. In the case where the velocity adjusting unit 4 is provided as interposed between the A/D converter 2 and the reference signal generating unit 5, the value of $W_{ref}$ is suitably varied. On the other hand, in the case where the velocity adjusting unit 4 is provided as interposed between the velocity deviation detecting unit 3 and the velocity signal generating unit 6, the value of H is suitably changed. By changing the value of $W_{ref}$ or H suitably in this manner, the relation between the angular velocity W of motor and operating time t may be indicated by the lines graphically shown in FIG. 3. Conversely, the role of the velocity adjusting unit 4 is to obtain a desired velocity profile a by eliminating various factors which might influence the angular velocity W of motor 13.

Figure 4:
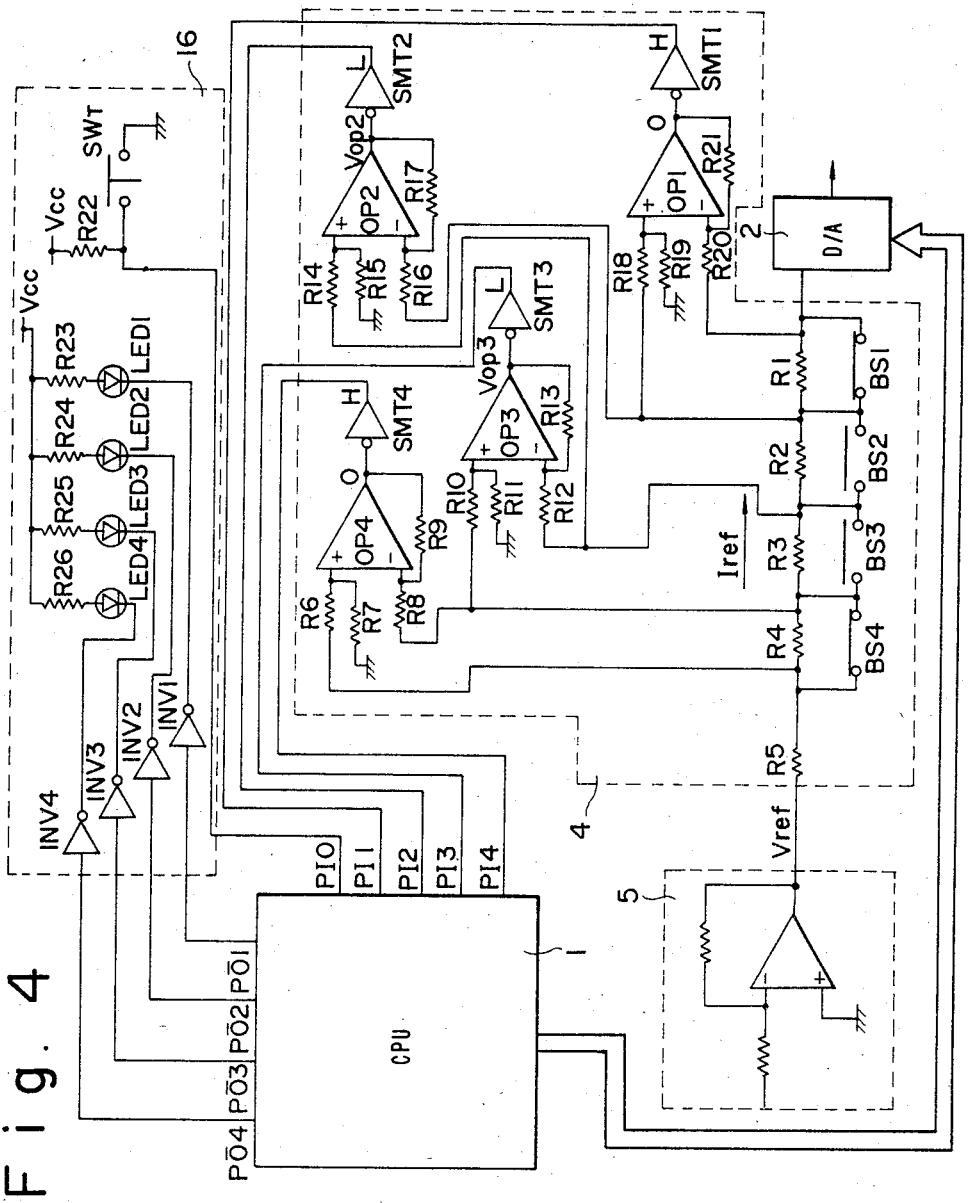
FIG. 4 is a circuit diagram showing one embodiment of the present invention when applied to the system of FIG. 1.

FIG. 4 shows the detailed structure of velocity adjusting or operating time adjusting unit 4 constructed in accordance with one embodiment of the present invention. It is to be noted that the structure shown in FIG. 4 is the case in which the velocity adjusting unit 4 is provided as interposed between the D/A converter 2 and the reference signal generating unit 5; however, the velocity adjusting unit 4 may also be provided as interposed between the velocity deviation detecting unit 3 and the velocity signal generating unit 6, as indicated in FIG. 1. As shown in FIG. 4, the velocity adjusting unit 4 is connected to receive an output voltage $V_{ref}$ from the reference signal generating circuit 5 and supplies $I_{ref}$ varyingly in level to the D/A converter 2, thereby adjusting the velocity of motor 13. Thus, the velocity adjusting unit 4 effectively functions as a variable output resistor when viewed from the reference signal generating unit 5.

The velocity adjusting unit 4 of FIG. 4 includes a reference resistor R5, velocity adjusting resistors R4–R1 and shorting bars BS4–BS1, each of which may be selectively and individually operated to shunt the corresponding velocity adjusting resistor. The velocity adjusting resistors R4–R1 have electrical resistances which are weighed such as $R4=2^3R$, $R3=2^2R$, $R2=2R$ and $R1=R$. Thus, with one extreme condition, in which all of BS4–BS1 are open, indicated by "15" and the other extreme condition, in which all of BS4–BS1 are closed or shunted, indicated by "0", the relation between $I_{ref}$ and $V_{ref}$ may be expressed as shown in the following table with "0" indicating the open condition and "S" indicating closed or shorted condition.

| COUNT | BS4 | BS3 | BS2 | BS1 | $I_{ref}$ |
|---|---|---|---|---|---|
| 15 | O | O | O | O | $\frac{V_{ref}}{(R5+15R)} \cong \left(1 - 15\frac{R}{R5}\right) \frac{V_{ref}}{R5}$ |
| 14 | O | O | O | S | $\frac{V_{ref}}{(R5+14R)} \cong \left(1 - 14\frac{R}{R5}\right) \frac{V_{ref}}{R5}$ |
| 13 | O | O | S | O | $\frac{V_{ref}}{(R5+13R)} \cong \left(1 - 13\frac{R}{R5}\right) \frac{V_{ref}}{R5}$ |
| 12 | O | O | S | S | $\frac{V_{ref}}{(R5+12R)} \cong \left(1 - 12\frac{R}{R5}\right) \frac{V_{ref}}{R5}$ |
| 0 | S | S | S | S | $\frac{V_{ref}}{R5} \cong \frac{V_{ref}}{R5}$ |

On the other hand, we have $$I_{ref} = \frac{V_{ref}}{R5 + nR} \quad (2)$$

and, assuming the condition that $R5 \gg R$, then we have the folowing relation.

$$I_{ref} \cong \left(1 - n\frac{R}{R5}\right) \frac{V_{ref}}{R5} \quad (3)$$

As is obvious from the above equation (3), the value of $I_{ref}$ varies stepwise with the increment of R/R5 multiplied by the count n, indicating that the velocity of motor 13 may be varied in a stepwise fashion with the same amount of increase in each step. Thus, with number n of adjusting resistors and equal number of shorting elements, the level of velocity may be varied over $2^n$ number of steps. In the illustrated embodiment, by having one or more of the shorting bars BS4-BS1 activated selectively, the velocity may be adjusted over 16 levels.

Of importance, the velocity adjusting unit 4 of FIG. 4 has a function of detecting the set value determined by the conditions of shorting bars BS4-BS1. That is, the velocity adjusting unit 4 includes op amps OP1-OP4, each of which has its two inputs connected to both ends of the corresponding adjusting resistor, and resistors R6-R21 appropriately connected as shown as input and feedback resistors for the corresponding op amps OP1-OP4. It is set such that R1-R4 are much smaller in electrical resistance than R6-R21, so that the current flowing through each of op amps OP1-OP4 is negligibly small as compared with current $I_{ref}$. Each of op amps OP1-OP4 has its output connected to an input of a corresponding Schmitt circuit SMT1-SMT4, which functions to convert the output from op amps OP1-OP4 to TTL level.

Supposing that the shorting bar BS4 is activated or in the shorted condition, then the voltage difference across the resistor R4 is zero, so that the output form op amp OP4 is also zero, thereby producing Hi as an output of Schmitt circuit SMT4. If the shorting bar BS3 is open and not in a shorted condition, then a voltage difference of $R3 \times I_{ref}$ appears across the resistor R3, so that a voltage of $V_{op3}$ is produced at the output of op amp (operational amplifier) OP3, thereby causing the output of SMT3 to be Lo. In this manner, depending upon whether each of the shorting bars BS4-BS1 is open or closed, the output from each of Schmitt circuits SMT4-SMT1 is determined to be either Hi or Lo. Each of the Schmitt circuits SMT4-SMT1 has its output connected to the corresponding input port PI4-PI1 of the processing unit 1.

As shown in FIG. 4, the servo-motor control system of the present invention also includes an indicator unit 16 provided as connected to the processing unit 1. Described more in detail, the processing unit 1 has output ports PO1-PO4, each of which is connected to the input of the corresponding inverter INV1-INV4 which have their outputs connected to the cathodes of respective light emitting diodes LED1-LED4 whose anodes are connected to supply voltage $V_{cc}$ via corresponding resistors R23-R26. The indicator unit 16 also includes a test switch $SW_T$ which connects the input port PI0 of processing unit 1 to ground when activated and connects the input port PI0 to the supply voltage $V_{cc}$ when deactivated.

In operation, when the test switch $SW_T$ is turned on, the processing unit 1 detects this condition at the input port PI0 and sends instructions thereby causing the servo-motor 13 to once return to the home position and then to operate in a predetermined pattern programmed to measure the operating time period. Such an operation is repeated over N number of times under the control of processing unit 1 and then the average operating time $\overline{T}$ is calculated as follows:

$$\overline{T} = \Sigma T/N \quad (4).$$

Then, the processing unit 1 determines a shift amount $\Delta A$ which is a difference between the currently set operating time and an optimum operating time using the following relation.

$$\Delta A = INT\left(\frac{\overline{T} - T_{ref}}{\Delta T}\right) \quad (5)$$

At the same time, the processing unit 1 determines the current operating time or velocity condition set in the velocity adjusting unit 4 from the condition of inputs supplied at input ports PI1-PI4 and executes the addition of the above $\Delta A$ to the current value thereby determining a new optimum operating time. Then, the processing unit 1 supplies a data indicating the newly determined optimum operating time to its output ports PO1-PO4 so that the light emitting diodes LED1-LED4 are selectively lit thereby indicating which of the shorting bars BS1-BS4 are to be activated or closed. Thus, it is only necessary for the operator to depress the corresponding shorting bar or bars BS1-BS4 as indicated by the on-off conditions of light emitting diodes LED1-LED 4. In this manner, a desired operating time or velocity condition may be easily and reliably set.

Among other things, the present invention allows to obtain following advantages.

(1) Extremely easy adjusting operation because the operating time may be shifted digitally.

(2) Easy maintenance due to provision of set value detecting function and optimum value indicating function.

(3) No skills are needed because the operator is only required to turn the test switch on and to activate the corresponding shorting bar or bars by looking at the on/off condition of the LEDs in carrying out adjustment of operating time.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An adjustable servo-system capable of adjusting the operating time of its servo-motor, comprising;
   setting means for setting the operating time of said servo-system in a stepwise fashion over a predetermined range;
   operating means responsive to said setting means for operating said servo-motor in accordance with the operating time determined by said setting means, said operating means, when activated by a test switch, causing said servo-motor to once move to a predetermined position and detecting a currently set operating time which is currently set in said setting means and calculating an average operating time of said servo-motor by repeatedly operating said servo-motor over a predetermined number of times under said currently set operating time, thereby determining a difference between said currently set operating time and said average operating time to obtain an optimum operating time of said servo-motor on the basis of said difference; and
   means for indicating said optimum operating time to an operator.

2. A servo-system of claim 1 wherein said setting means for setting includes a plurality of series-connected resistors and a like plurality of shorting bars each of which is provided to short the corresponding resistor when activated.

3. A servo-system of claim 2 wherein said plurality of series-connected resistors have electrical resistances which are weighted proportionately.

4. A servo-system of claim 3 wherein the electrical resistance of each of said series-connected resistors has a value determined by a product of $2^n$ and R where n is the number of the resistor in question from one end of said series connection and R is a predetermined resistance.

5. A servo-system of claim 2 wherein said means for indicating includes a like plurality of indicator lamps which are selectively lit to indicate that the corresponding shorting bar or bars are to be activated.

6. A servo-system of claim 5 wherein each of said indicator lamps is comprised of a light emitting diode.

7. A servo-system of claim 2 wherein said each of said like plurality of shorting bars is provided to be manually activated by an operator.

8. A servo-system of claim 1 further comprising a switch for causing said means for indicating to be operative or inoperative depending on its condition.

9. A servo-system claim 1 wherein said test switch is provided to be manually activated by an operator.

10. A servo-system of claim 1 wherein said servo-motor is operatively coupled for driving to move a print wheel/carriage of a printer.

11. A servo-system of claim 10 wherein said predetermined position is a home position of said print wheel/carriage.

* * * * *